US006477486B1

(12) United States Patent
Ram et al.

(10) Patent No.: US 6,477,486 B1
(45) Date of Patent: *Nov. 5, 2002

(54) AUTOMATIC LOCATION DETERMINATION OF DEVICES UNDER TEST

(75) Inventors: Subha Rojan Ram; Roger Wong, both of Austin, TX (US)

(73) Assignee: Dell USA, L.P., Round Rock, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 166 days.

(21) Appl. No.: 09/150,800

(22) Filed: Sep. 10, 1998

(51) Int. Cl.[7] .......................... G06F 11/00; G06F 15/00
(52) U.S. Cl. ...................................... 702/188; 702/183
(58) Field of Search ................................ 709/223, 224, 709/230, 247, 250; 707/10; 370/251, 252, 241, 244, 250, 218, 219, 220, 221, 222, 223, 224; 714/724, 733, 742, 750, 25, 30; 702/188, 183

(56) References Cited

U.S. PATENT DOCUMENTS

| | | | | |
|---|---|---|---|---|
| 4,636,725 A | * | 1/1987 | Santomango et al. | 324/158 F |
| 4,706,208 A | | 11/1987 | Helms | |
| 4,737,953 A | * | 4/1988 | Koch et al. | 370/94 |
| 4,761,747 A | * | 8/1988 | Guader | 364/514 |
| 4,866,714 A | * | 9/1989 | Adams et al. | 714/724 |
| 5,060,068 A | * | 10/1991 | Lindstrom | 358/185 |
| 5,341,363 A | * | 8/1994 | Hirasawa | 370/13 |
| 5,434,775 A | | 7/1995 | Sims et al. | |
| 5,457,729 A | * | 10/1995 | Hamann et al. | 379/2 |
| 5,461,624 A | * | 10/1995 | Mazzola | 370/85.13 |
| 5,513,188 A | * | 4/1996 | Parker et al. | 371/22.3 |
| 5,557,559 A | | 9/1996 | Rhodes | |
| 5,581,600 A | * | 12/1996 | Watts et al. | 379/67 |
| 5,680,585 A | * | 10/1997 | Bruell | 395/500 |

(List continued on next page.)

OTHER PUBLICATIONS

Hughes et al., Modular software for VME/VXI subsystems, 1989, IEEE, CH2568–4/89/0000–0124, pp. 124–131 (8).*
Cascia, VXI ATE Technology, 1990, IEEE, Chikira 2793–8/90/000–0137, pp. 137–144 (8).*
Young et al. Digital Electronic Engine Control (DEEC)/Engine Diagnostic Unit (EDU) Function Tester (DEFT) for the F100–PW–220/–229 engines, 1998, IEEE, 0–7803–4420–0/98, pp. 494–497 (4).*
DesJardin, Downsizing with VXIbus: Opportunities and limitations in factory, field and portable environments, 1989, IEEE, Ch2568–4/89/0000–0055, pp. 55–62 (8).*
Duarte Jr. et al., Hierarchical Adaptive Distributed System–Level Diagnosis Applied for SNMP–based Network Fault Management, 1996, IEEE, 1060–9857/96, pp. 98–107 (10).*

(List continued on next page.)

*Primary Examiner*—Le Hien Luu
*Assistant Examiner*—Bunjob Jaroenchonwanit
(74) *Attorney, Agent, or Firm*—Haynes and Boone, LLP

(57) ABSTRACT

A test device for a computer system includes a burn rack having a plurality of workcells. A simple network management protocol switch device is provided adjacent the burn rack. The switch device includes a plurality of ports. A plurality of cables are provided such that a respective cable interconnects a respective port of the switch device and a respective workcell. A monitor is provided adjacent the burn rack and is connected to a port of the switch device. At least one of the workcells has a computer mounted therein provided with a unique Mac Address and connected to the respective cable at the respective workcell. The monitor is connected to a burn rack database.

12 Claims, 3 Drawing Sheets

U.S. PATENT DOCUMENTS

| | | | | | |
|---|---|---|---|---|---|
| 5,689,604 | A | * | 11/1997 | Janus et al. | 385/134 |
| 5,708,654 | A | * | 1/1998 | Ardant et al. | 370/242 |
| 5,774,695 | A | * | 6/1998 | Autrey et al. | 395/500 |
| 5,784,516 | A | * | 7/1998 | Parzygnat et al. | 385/134 |
| 5,861,882 | A | * | 1/1999 | Sprenger et al. | 345/326 |
| 5,862,040 | A | * | 1/1999 | Adnan | 361/809 |
| 5,889,470 | A | * | 3/1999 | Kaycee et al. | 340/825.07 |
| 5,903,698 | A | * | 5/1999 | Poremba et al. | 385/135 |
| 5,913,037 | A | * | 6/1999 | Spofford et al. | 709/226 |
| 5,914,609 | A | * | 6/1999 | Curry et al. | 324/601 |
| 5,919,248 | A | * | 7/1999 | Kahkoska et al. | 709/224 |
| 5,954,832 | A | * | 9/1999 | LeBlanc | 714/724 |
| 5,956,719 | A | * | 9/1999 | Kudo et al. | 707/10 |
| 5,982,753 | A | * | 11/1999 | Pendleton et al. | 370/252 |
| 5,991,759 | A | * | 11/1999 | Knoblock et al. | 707/10 |
| 6,032,183 | A | * | 2/2000 | Chen et al. | 709/223 |
| 6,069,873 | A | * | 5/2000 | Pugaczewski et al. | 370/241 |
| 6,079,034 | A | * | 6/2000 | VanZante et al. | 714/48 |
| 6,097,705 | A | * | 8/2000 | Ben-Michael et al. | 370/315 |
| 6,127,834 | A | * | 10/2000 | Eliasberg et al. | 324/760 |
| 6,216,243 | B1 | * | 4/2001 | Wittrodt | 714/734 |
| 6,285,967 | B1 | * | 9/2001 | Rajan et al. | 702/188 |

OTHER PUBLICATIONS

Achieving high throughput with register–based dense matrix relay modules, Tsai et al., Inspect, p. 1, Apr. 1992.*

Concurrent signal generator engineering and manufacturing., Bostak et al., Gale Group Computer, pp. (1–10) 10, Apr. 1993.*

NIC index testbed, Tam et al., Gale Group Computer, pp. (1–3) 3, Nov. 1994.*

A guide to network product testing., Desnoyes, Gale Group Computer, pp. (1–7) 7, Dec. 1995.*

Keeping Windows clients in hand., Dennis, Computer News, pp. (1–3) 3, Nov. 1997.*

* cited by examiner

| Rack | Switch |
|---|---|
| Rack 10 | S1 |
| Rack 10 | S2 |
| Rack 10 | S3 |
| Rack 10 | S4 |

| Port ID | Switch ID | Port Num | Mac Address | Switch IP Address |
|---|---|---|---|---|
| P1 | S1 | 1 | | 10.12.15.16 |
| P2 | S1 | 2 | | 10.12.15.16 |
| P3 | S1 | 3 | | 10.12.15.16 |
| P4 | S1 | 4 | | 10.12.15.16 |

| Work Cell ID | Port ID | Rack ID | Row ID | Column ID | Side |
|---|---|---|---|---|---|
| a | P1 | Rack 10 | 1 | 1 | A |
| b | P2 | Rack 10 | 2 | 1 | A |
| c | P3 | Rack 10 | 3 | 1 | A |
| d | P4 | Rack 10 | 4 | 1 | A |

Fig. 7

| Port Num | Mac Address |
|---|---|
| 1 | 8000xcdfd |
| 2 | 8000xcdf2 |
| 3 | 8000xcdf5 |
| 4 | 8000xcdf8 |

Fig. 8

| Port ID | Switch ID | Port Num | Mac Address | Switch IP Address |
|---|---|---|---|---|
| P1 | S1 | 1 | 8000xcdfd | 10.12.15.16 |
| P2 | S1 | 2 | 8000xcdf2 | 10.12.15.16 |
| P3 | S1 | 3 | 8000xcdf5 | 10.12.15.16 |
| P4 | S1 | 4 | 8000xcdf8 | 10.12.15.16 |

Fig. 9

| Bar Code | Rack ID | Row ID | Coulmn ID | Test | Time Stamp |
|---|---|---|---|---|---|
| B1 | Rack 10 | 1 | 1 | ET1 | 11:00:00 AM June 12 1998 |
| B2 | Rack 10 | 2 | 1 | SWD1 | 11:01:00 AM June 12 1998 |
| B3 | Rack 10 | 3 | 1 | ET2 | 11:04:00 AM June 12 1998 |
| B4 | Rack 10 | 4 | 1 | SWD2 | 11:07:00 AM June 12 1998 |

AUTOMATIC LOCATION DETERMINATION OF DEVICES UNDER TEST

BACKGROUND

This invention is related generally to building computer systems and more particularly to the preparation of build-to-order computer systems.

This application relates to co-pending U.S. patent application Ser. No. 08/919,959, filed on Aug. 29, 1997, entitled Software Installation and Testing For A Build-To-Order Computer System, naming Richard D. Amberg, Roger W. Wong and Michael A. Brundridge, as inventors. The co-pending application is incorporated herein by reference in its entirety, and is assigned to the assignee of this invention.

This application relates to co-pending U.S. patent application Ser. No. 08/921,438, filed on Aug. 29, 1997, entitled Database For Facilitating Software Installation And Testing For A Build-To-Order Computer System, naming Richard D. Amberg, Roger W. Wong and Michael A. Brundridge as inventors. The co-pending application is incorporated herein by reference in its entirety, and is assigned to the assignee of this invention.

Many methods have been devised for tracking inventory. In U.S. Pat. No. 5,434,775, the locations of a plurality of devices are tracked using a network of communication links, each of which corresponds to a location. Each device is given a tag that identifies the device with respect to other devices and that is connectable to a communication link when the device is disposed at the location to which the link corresponds. Each tag that is connected to each communication link is detected, and the location of each device is determined based on the detection. One feature of the technique is additionally determining the conditions of the devices by correlating one or more communication links with conditions. The technique is simple to use and a highly effective technique in tracking devices stored at various locations throughout a facility. Device location and condition are monitored continuously, thereby reducing the risk that the removal of a device from storage will go undetected.

A present trend among some computer manufacturers is to provide a customer with a custom-built computer system in which the customer has designated that certain components and capabilities be included in the system being ordered. It is therefore important to maximize efficiency at every step of the build-to-order process. That efficiency begins at the time the order is placed and processed, and continues throughout the assembly, testing and shipment of the custom-built unit.

During production of build-to-order computer systems, specific parts for a computer are pulled from stock and taken to an assembly pod where those specific parts are assembled in the computer chassis. Following assembly, the chassis is moved to a quick-test area where tests are conducted to quickly determine whether the correct parts for that order are installed, and whether the parts are operative.

Following the quick test procedure, assembled chassis are moved to a burn rack where the parts are "burned in" and where operational errors may be detected. Many units are simultaneously tested on the burn racks and the tests may take a couple of hours to complete. With many units in production waiting to be tested, it is important that the burn rack spaces available for testing are used efficiently. Therefore, it is important that the computers or devices under test (DUT) are tested in a manner which quickly and efficiently determines whether a DUT is satisfactorily operational and if not, which quickly and efficiently identifies operational deficiencies so that the DUT may be removed from the burn rack to free up the occupied burn rack space for another DUT to be tested.

When a DUT is on the burn rack, the software ordered with the system is also downloaded to the DUT from a server. Personnel monitor the burn rack test units for visual and audible indications, i.e. LED's and beeps, of how the testing and downloading procedures are progressing. A red LED indication accompanied by an audible beep indicates a failed DUT which is returned to quick test where it is thoroughly tested by a technician. A green LED indication means that a unit is ready to be moved on to a final test to check the screen and the operating system prior to shipping the unit.

When software downloading is to be accomplished, the DUT is identified to the server for download of the appropriate software. Each DUT is identified by a lifetime identifier (serial number) in the form of a bar code. When the DUT is on the burn rack, its physical location is also identified by a rack, a column on the rack and a row in the column. Each burn rack location is serviced by a location specific cable and a network device which interconnects the cable to the DUT. However, although the cable can only service a specific rack location, the network device can and does sometimes become detached from one cable and attached to another. Each network device has a MAC address which is mapped to a location in terms of the rack, the column and the row. The mapping information is stored in a database in the network environment. The DUT can communicate with the database. As a result, the exact location of the DUT can be determined. Therefore, if the connector is moved to a different rack location and is connected to another cable, the information in the database will be inconsistent with the exact location of the DUT.

Therefore, what is needed is a burn rack monitoring system which enables manufacturing to pinpoint and track the physical location of each DUT so that each device can be located for correction in the event of a test failure, and to assure that devices which test successfully are shipped to the correct customer.

SUMMARY

On embodiment accordingly, provides an automatic means for determining the location of a DUT device by mapping a DUT, connected to a simple network management protocol (SNMP) enabled network, to a physical location. As a result, a device and method are provided to track a DUT during the manufacturing process. To this end, a burn rack test device includes several workcells. An SNMP switch device is provided adjacent the burn rack. The switch device includes several ports. A plurality of cables are provided such that a respective cable interconnects a respective port of the switch device and a respective workcell. A monitor is provided adjacent the burn rack. The monitor is connected to a port of the switch device.

The principal advantages of these embodiments are that DUT's being manufactured may be tracked throughout the build process on the burn racks. This permits optimum usage of the burn rack space and saves wait time for systems which need to be loaded onto the burn racks. In addition, it is possible to estimate the length of time required to test DUT's on the burn racks. Also, the ease of tracking DUT's helps to consolidate all systems belonging to one large order for efficient shipping and delivery.

BRIEF DESCRIPTION OF THE DRAWINGS

FIG. 2 is a diagrammatic view illustrating an embodiment of a burn rack test device connected to an SNMP switch device.

FIG. 7 is a table illustrating a port number to Mac Address map.

FIG. 8 is a table illustrating a port identification to Mac Address map.

FIG. 9 is a table illustrating the most current state for the devices under test.

DETAILED DESCRIPTION OF THE PREFERRED EMBODIMENT

Figures 1, 3, 4, 5:
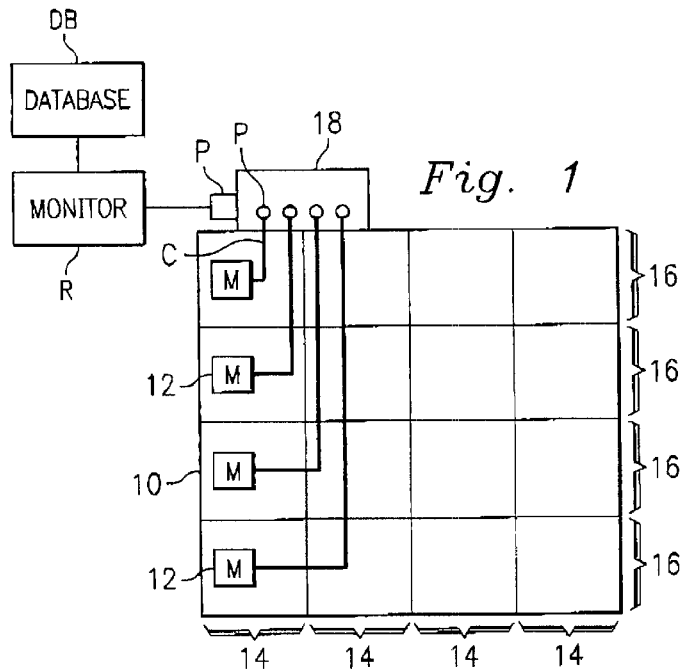
FIG. 1 is a diagrammatic view illustrating an embodiment of a burn rack test device.
FIG. 3 is a table illustrating a work area to switch map.
FIG. 4 is a table illustrating a port identification.
FIG. 5 is a table illustrating a workcell to cable wire map.

The present embodiment, FIG. 1, is for a burn rack 10 divided into workcells 12 arranged in columns 14 and rows 16. An SNMP switch device 18 is adjacent rack 10 and has several ports P connected by cables C to computer systems or DUTS, designated M in each workcell 12. Another port P connects switch device 18 to a monitor R which is in turn connected to a database DB.

The burn rack 10, FIG. 2, has the several workcells 12 arranged in vertical columns 14 and horizontal rows 16 to form a grid array. Each burn rack 10 includes an A side and an identical B side (not shown), only one of which, the A side, will be further discussed in detail. The A side of burn rack 10 is divided into columns one to nine, and rows one to five, to thus form forty-five workcells 12. Therefore, the A and B sides of rack 10 combine to represent ninety workcells 12. Commonly, a manufacturing facility will have many such burn racks 10 providing hundreds of workcells 12 for testing computer systems M prior to shipment.

In the present embodiment, SNMP switch device 18, is provided adjacent burn rack 10. Switch device 18 includes a plurality of switches S1, S2, S3 and S4, each having several ports, e.g. ports one to twenty-four. Therefore, a minimum of four switches S1, S2, S3 and S4, are required to provide a sufficient number of ports for the ninety workcells 12 of burn rack 10.

The twenty-four ports of switch S1, are numbered one to twenty-four, of switch S2, are numbered twenty-five to forty-eight, of switch S3, are numbered forty-nine to seventy-two, and of switch S4, are numbered seventy-three to ninety-six. The combination of port one of switch S1 is designated by a port ID P1, port two of switch S1 is designated P2, port three of switch S1 is designated P3, and so on. Similarly, the combination of port 25 of switch S2 is designated P25, and so on. The port ID's will be discussed below.

Each workcell 12 of burn rack 10 is also given an identifier, FIG. 2, e.g. workcell 12 of rack 10, column one, row one, is designated a workcell ID a, of rack 10, column one, row two, is designated a workcell ID b, and so on. However, for purposes of this discussion, only four workcells 12, designated a-d will be discussed in detail. Therefore, a rack-switch relation, FIG. 3, is stored in the database DB containing information relating rack 10 to switches S1, S2, S3 and S4, and functions as a table storing a work area to switch map.

The port identification, e.g. port ID can be established in a table, FIG. 4, identifying the above-described port ID's P1 to P4, in this example, relating to switch ID, S1, and relating to port numbers one to four. Also, a switch IP address is manually stored in the database DB to establish a network connection. As a result, information is stored in the database DB in such a way that each workcell ID, a to d, is linked to a port ID, P1 to P4, as illustrated in FIG. 5, which is a table storing a workcell and cable map.

Figure 6:
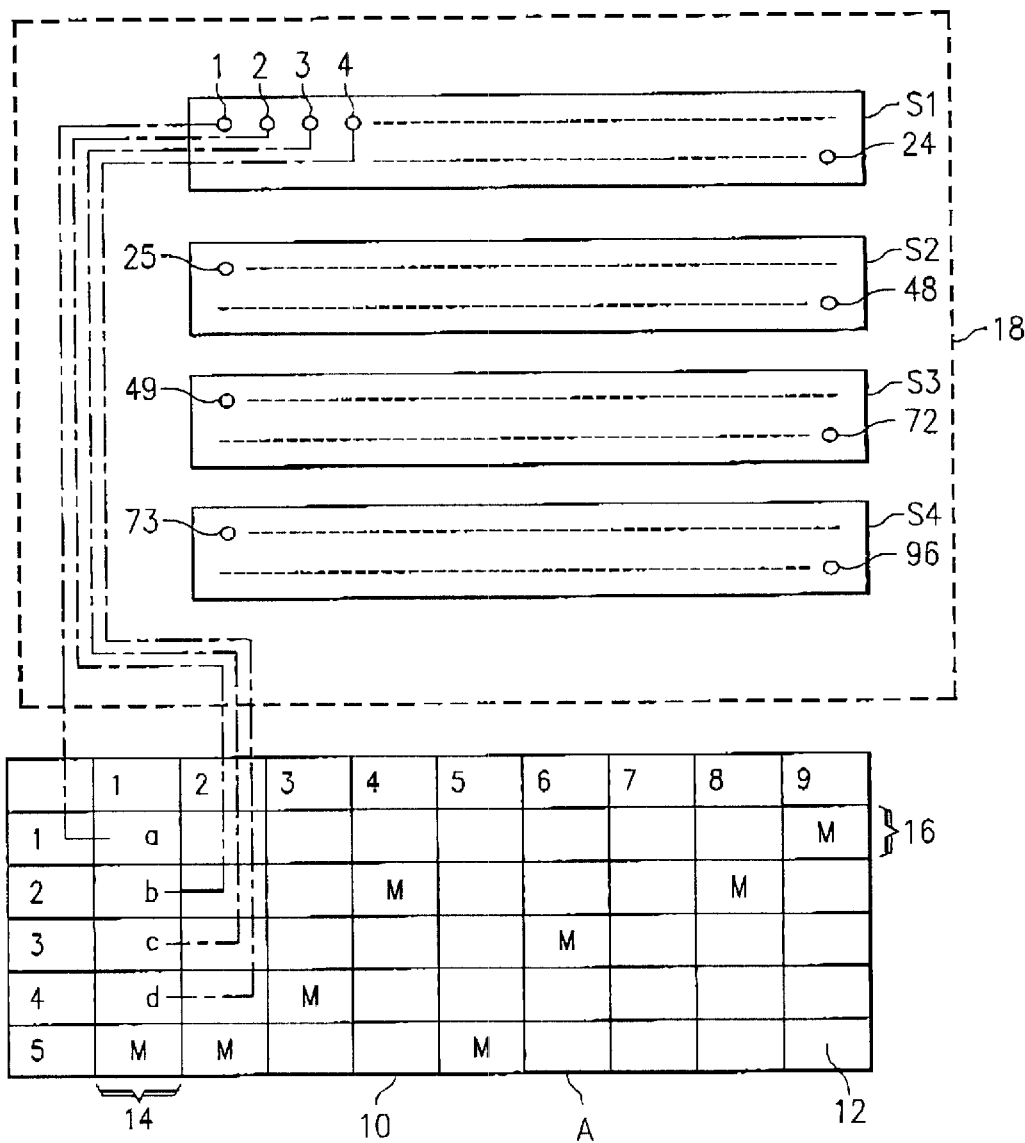
FIG. 6 is a table illustrating a broadcast from devices under test on a burn rack.

When the DUT's designated M, FIG. 1, are placed on burn rack 10, the DUT's send IPX broadcasts which include a Mac Address installed in each DUT via a network card. The broadcasts from the DUT's are stored in the database DB. The information being stored is in the form illustrated in the table of FIG. 6, which relates the Mac Address to a lifetime bar code identifier of each DUT, a test identification, and a time stamp for the start of the test.

The Mac Addresses are used to query the switches S1 to S4 on burn rack 10 to determine what port each switch S1 to S4 is connected to. This Mac Address information is stored by switches S1 to S4 in the network database, and is illustrated in the table of FIG. 7. After the port number is identified, the Mac Addresses can be updated in the table of FIG. 8 which completes the Mac Address information unavailable in the table of FIG. 4, and provides the complete information needed to determine the location of each DUT. Finally, information is stored in a consolidated form in the table of FIG. 9, showing only the most current state for the DUT. This information is used to track the DUT to a location. On repeat broadcasts from the DUT's, earlier data in the table is removed for archiving, thereby storing only the latest information.

As it can be seen, the principal advantages of these embodiments are that DUT's being manufactured may be tracked throughout the build process on the burn racks. This permits optimum usage of the burn racks space and saves wait time for systems which need to be loaded onto the burn racks. In addition, it is possible to estimate the length of time required to test DUT's on the burn racks. Also, the ease of tracking DUT's helps to consolidate all systems belonging to one large order for efficient shipping and delivery.

As a result, one embodiment provides a burn rack test device including a burn rack having a plurality of workcells. A simple network management protocol switch device is provided adjacent the burn rack. The switch device includes a plurality of ports. A respective cable is provided to interconnect each port of the switch device and a respective workcell. Another embodiment provides a monitor adjacent the burn rack, connected to a port of the switch device and connected to a burn rack database.

A further embodiment provides a method for testing a computer during a manufacturing process. A burn rack is provided and includes a plurality of workcells. A simple network management protocol device is mounted adjacent the burn rack and includes a plurality of ports. A plurality of cables are interconnected between each port and each workcell. A monitor is mounted adjacent the burn rack and is connected to a port of the switch device. A computer is mounted in at least one of the workcells. The computer is connected to the respective cable in the respective workcell. The monitor is connected to the burn rack database.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A burn rack test device comprising:
   a burn rack including a plurality of workcells, each workcell having a workcell identifier;
   a simple network management protocol switch device adjacent the burn rack, the switch device including a plurality of ports and switches, each port having a port identifier and each switch having a switch identifier;
   a plurality of cables, a respective cable interconnecting a respective port of the switch device and a respective workcell;
   a monitor adjacent the burn rack, the monitor connected to a database and to a port of the switch device;
   at least one of the workcells having a device under test mounted therein being tracked during a build process and connected to the respective cable at the respective workcell;
   each device under test being provided with a unique Mac Address, the Mac Address relating to a lifetime identifier being used for tracking the device under test during the build process, a test identification, and a time stamp for the start of the a test;
   each switch and a related one of the ports designate a port identifier, whereby the Mac Address is used to determine which port each switch is connected to;
   each device under test repeatedly broadcasting information including the Mac Address, the information being stored in the database; and
   a subsequent broadcast for each device under test removing previously broadcast information and storing updated information from the subsequent broadcast in the database.

2. The burn rack test device as defined in claim 1 wherein the database stores a work area to switch map.

3. The burn rack test device as defined in claim 1 wherein the a switch IP address is stored in the database to establish a network connection.

4. The burn rack test device as defined in claim 1 wherein the database stores a workcell and cable map.

5. The burn rack test device as defined in claim 1 wherein broadcasts from each device under test are stored in the database which relates the Mac Address to the lifetime identifier of each device under test.

6. The burn rack test device as defined in claim 5 wherein the Mac Address is used to determine what port each switch is connected to.

7. A test device for a computer system comprising:
   a burn rack including a plurality of workcells, each workcell having a workcell identifier;
   a simple network management protocol switch device adjacent the burn rack, the switch device including a plurality of ports and switches, each port having a port identifier and each switch having a switch identifier;
   a plurality of cables, a respective cable interconnecting a respective port of the switch device and a respective workcell;
   a monitor adjacent the burn rack, the monitor connected to a database and to a port of the switch device;
   a plurality of the workcells having a computer mounted therein being tracked during a build process and connected to the respective cable at the respective workcell;
   each computer being provided with a unique Mac Address, the Mac Address relating to a lifetime identifier being used for tracking the computer during the build process, a test identification and a time stamp forth the start of the test;
   each switch and a related one of the ports designate a port identifier, whereby the Mac Address is used to determine which port each switch is connected to;
   each computer repeatedly broadcasting information including the Mac Address, the information being stored in the database; and
   a subsequent broadcast for each computer removing previously broadcast information and storing updated information from the subsequent broadcast in the database.

8. The burn rack test device as defined in claim 7 wherein the database stores a work area to switch map.

9. The burn rack test device as defined in claim 7 wherein a switch IP address is stored in the database to establish a network connection.

10. The burn rack test device as defined in claim 7 wherein the database stores a workcell and cable map.

11. The burn rack test device as defined in claim 7 wherein broadcasts from each computer are stored in the database which relates the Mac Address to the lifetime identifier for each computer.

12. A method of testing a computer during a manufacturing process comprising the steps of
   providing a bum rack including a plurality of workcells, each workcell having a workcell identifier,
   mounting a simple network management protocol switch device adjacent the burn rack, the switch device including a plurality of ports and switches, each port having a port identifier and each switch having a switch identifier;
   interconnecting a plurality of cables, a respective cable interconnecting a respective port of the switch device and a respective workcell;
   mounting a monitor adjacent the burn rack, the monitor connected to a database and to a port of the switch device;
   mounting a computer in at least one of the workcells, the computer being tracked during the manufacturing process and being connected to the respective cable in the respective workcell;
   providing a unique Mac Address to each computer;
   relating the Mac Address to a lifetime identifier being used for tracking the computer during the build process, a test identification and a time stamp forth the start of the test;
   utilizing each switch and one of the related ports to designate a port identifier;
   utilizing the Mac Address to determine which port each switch is connected to;
   broadcasting information from the computer including the Mac Address;
   storing the broadcast information in a database;
   repeating a broadcast for each computer to remove previously broadcast information; and
   storing updated information from the repeat broadcast in the database.

* * * * *

UNITED STATES PATENT AND TRADEMARK OFFICE
CERTIFICATE OF CORRECTION

PATENT NO. : 6,477,486 B1
DATED : November 5, 2002
INVENTOR(S) : Subha Rojan Ram and Roger Wong It is certified that error appears in the above-identified patent and that said Letters Patent is hereby corrected as shown below:

<u>Title page,</u>
Item [54], Title, please delete "AUTOMATIC LOCATION DETERMINATION OF DEVICES UNDER TEST" and insert -- A SYSTEM FOR TROUBLESHOOTING AND MANAGING INFORMATION OF DEVICES UNDER TEST DURING A MANUFACTURING PROCESS --

Signed and Sealed this

First Day of April, 2003

JAMES E. ROGAN
*Director of the United States Patent and Trademark Office*